United States Patent [19]

Watanabe et al.

[11] Patent Number: 5,229,101

[45] Date of Patent: Jul. 20, 1993

[54] PROCESS FOR PRODUCING A POWDER OF PEROVSKITE-TYPE DOUBLE OXIDE

[76] Inventors: Munetoshi Watanabe, 13-65-305 Makita-cho, Takatsuki City, Osaka Pref., Japan; Hiroyuki Hata, 4-3-21 Shirogayama Tarumi-ku, Kobe City, Hyogo Pref., Japan

[21] Appl. No.: 638,960

[22] Filed: Jan. 9, 1991

[51] Int. Cl.[5] .................. C01G 21/00; C01G 33/00
[52] U.S. Cl. ............................... 423/593; 423/598; 423/599; 501/134; 501/135; 501/136
[58] Field of Search ........... 423/593, 596, 598, 599; 501/134, 135, 136; 252/62.9

[56] References Cited

U.S. PATENT DOCUMENTS

| 3,963,630 | 6/1976 | Yonezawa et al. | 252/62.9 |
| 4,643,984 | 2/1987 | Abe et al. | 501/136 |
| 4,820,669 | 4/1989 | Kato et al. | 501/135 |
| 5,112,433 | 5/1992 | Dawson et al. | 423/593 |

FOREIGN PATENT DOCUMENTS

| 57-27974 | 2/1982 | Japan | 423/598 |
| 62-187116 | 8/1987 | Japan | 501/134 |
| 63-095119 | 4/1988 | Japan | 423/593 |
| 63-144115 | 6/1988 | Japan | 501/135 |

OTHER PUBLICATIONS

Grant & Hackh's "Chemical Dictionary", Fifth Edition, 1977 p. 157.

Primary Examiner—Michael Lewis
Assistant Examiner—Ngoc-Yen M. Nguyen
Attorney, Agent, or Firm—Armstrong, Nikaido, Marmelstein, Kubovcik & Murray

[57] ABSTRACT

A process for producing a powder of perovskite-type double oxide comprises the steps of reacting water-soluble lead oxide and aqueous solution of alkaline metal in a reaction vessel, and precipitating lead group hydroxide; then adding a solution of Nb group, precipitating Nb group hydroxide, and reacting hydrothermally in the reaction vessel. As a result, according to the present invention, the process of manufacture is capable of producing fine particles of pure perovskite phase, which particles are excellent in homogeneity and the degree of sintering.

2 Claims, 7 Drawing Sheets

PROCESS FOR PRODUCING A POWDER OF PEROVSKITE-TYPE DOUBLE OXIDE

BACKGROUND OF THE INVENTION

1. Field of the Invention

The present invention generally relates to a process for producing a powder of perovskite-type double oxide generally represented by the formula $ABO_3$, particularly to a process for producing the powder which has not only high perovskite ratio, but also homogeneous component and fine particles, moreover, which is excellent in degree of sintering.

2. Description of the Relevant Art

The perovskite-type double oxide has been extensively used for functional ceramics; such as, piezoelectrics, dielectrics, semiconductor, and material for a sensor or the like. Recently, it is actively promoted to improve the function and to add a function newly, wherein a raw powder is required as a homogeneous component, of fine particles and the property of being sintered at low temperature or the like.

Up to now, a solid phase synthesis and coprecipitation method have been used as a process for producing the powder of perovskite-type double oxide.

A summary of these methods is as follows.

(a) Solid phase synthesis

This method includes the steps of weighting compounds of each raw ingredient, mixing, and calcining. Although this method is generally used, high temperature reaction causes evaporation of the lead ingredient and heterogeneous component. And it is difficult to obtain fine particles.

In a reaction system including Nb, it is difficult to obtain a pure perovskite phase through the usual way, and the perovskite phase is contaminated with a pyrochlore phase. Since the pyrochlore phase causes it to lose degree of sintering, and make the electric property of sintered compact worse, several methods of decreasing pyrochlore phase is proved.

For example, a process for producing $Pb(Mg_{\frac{1}{3}}Nb_{\frac{2}{3}})O_3$ is reported by S. L. Swartz, T. R. Shrout et al. (Mater. Res. Bull. 17,1245 (1982)). According to this production process, the pure perovskite phase is obtained by means of two steps of calcining, as follows;

$MgO + Nb_2O_5 \rightarrow MgNb_2O_6$ (calcining temperature is about 1000° C.)

$\frac{1}{3}MgNb_2O_6 + PbO \rightarrow Pb(Mg_{\frac{1}{3}}N_{\frac{2}{3}})O_3$ (calcining temperature is about 900° C.)

Although, in the usual single step of calcining, repetition of calcining and pulverizing achieves an increase in the ratio of perovskite phase, it is difficult to obtain pure perovskite phase by means of this process. In any event, this method has still had subjects in terms of particle size and homogeneity of compound.

(b) Coprecipitation method

This method includes the steps of preparing mixed solution of each ingredient, obtaining precipitate by means of reaction of said mixed solution and alkaline solution, drying of said precipitation and calcining.

In this process, it is also difficult to obtain pure perovskite phase. Even though the powder of pure perovskite phase is obtained, its degree of sintering is not good, because secondary particles form in the step of precipitating, drying and sintering.

As is mentioned above, the powder of lead group perovskite double oxide containing Nb obtained by means of said method is not pure perovskite phase and is not good in the degree of sintering. Therefore, it has been required to improve the method.

SUMMARY OF THE INVENTION

While the present invention is based on the above description, a brief summary will be set forth. The process for producing the powder of perovskite-type double oxide generally represented by the formula $ABO_3$, comprising the steps of:

① reacting a solution including Nb and a solution including at least one additional element selected from among Zn, Mg, Zr, Ti, Ni, Fe, W, Co, and Mn, and preparing a homogenous solution of metal material B;

② reacting a solution including Pb or Pb and at least one element selected from among Ba, Sr, Ca, La, and Li, and an aqueous solution of alkaline metal in a reaction vessel, and precipitating hydroxide of metal material A;

③ adding said homogenous solution of metal material B to said hydroxide precipitate of metal material A in a reaction vessel, and precipitating hydroxide of metal material B;

④ reacting hydrothermally in the reaction vessel;

⑤ filtrating, cleaning and drying; and

⑥ heat-treating and pulverizing.

According to the present invention, the method described above is suitable for a process for producing the powder of perovskite-type double oxide generally represented by the formula $ABO_3$, especially the powder containing Nb as element B. And the process of manufacture is capable of producing fine particles of pure perovskite phase.

And this invention contributes to manufacturing dielectric ceramics having excellent property, and to manufacturing piezoelectric ceramics.

In accordance with one aspect of this invention, there are provided improvements in a process for producing the powder of perovskite-type double oxide containing Nb.

It is a further object of this invention to provide a process for producing a powder efficiently which is excellent in the degree of sintering, homogeneity and fine particles of pure perovskite phase.

These and other objects of the invention will be readily understood from the following description, taken in connection with the accompanying drawings.

DETAILED DESCRIPTION OF THE INVENTION

The perovskite-type double oxide is generally represented by the formula $ABO_3$. A and B represent metal elements, and O represents oxygen. For example, A is Pb or Pb and at least one element among Ba, Sr, Ca, La, Li or the like. B is Nb and at least one element among Zn, Mg, Zr, Ti, Ni, Fe, W, Mn, Co or the like. The composition of perovskite-type double oxide represented by the formula $ABO_3$ is as follows except $Pb(Mg_{\frac{1}{3}}Nb_{\frac{2}{3}})O_3$ described above:

| | |
|---|---|
| $Pb(Ni_{\frac{1}{3}}Nb_{\frac{2}{3}})O_3$, | $Pb(Co_{\frac{1}{3}}Nb_{\frac{2}{3}})O_3$, |
| $Pb(Zn_{\frac{1}{3}}Nb_{\frac{2}{3}})O_3$, | $Pb(Ni_{\frac{1}{3}}Nb_{\frac{2}{3}})O_3$—$PbTiO_3$—$PbZrO_3$, |
| $Pb(Fe_{\frac{1}{3}}Nb_{\frac{2}{3}})O_3$, | $Pb(Mg_{\frac{1}{3}}Nb_{\frac{2}{3}})O_3$—$PbTiO_3$, |
| $Pb(Mg_{\frac{1}{3}}Nb_{\frac{2}{3}})O_3$—$PbTiO_3$—$PbZrO_3$ | |

The material used in this reaction is not restricted, and can be a soluble compound, for example, chloride, oxichloride, nitrate, carbonate, hydroxide, acetate, oxalate, alkoxide or the like. Although these compounds are usually used as solution, they can be dissolved by acid or suitable solvent when they are slightly soluble in water. And they can be used as a suspension when they are insoluble in water.

Preferable materials are as follows:

$NbO_2$, $NbCl_5$, $Pb(NO_3)_2$, $PbO$, $Mg(NO_3)_2$, $MgCl_2$, $TiCl_4$, $TiO_2$, $NiCl_2$, $Ni(NO_3)_2$, $Fe(NO_3)_3$, $FeCl_3$, $CoCl_2$, $Co(NO_3)_2$.

Figure 1:
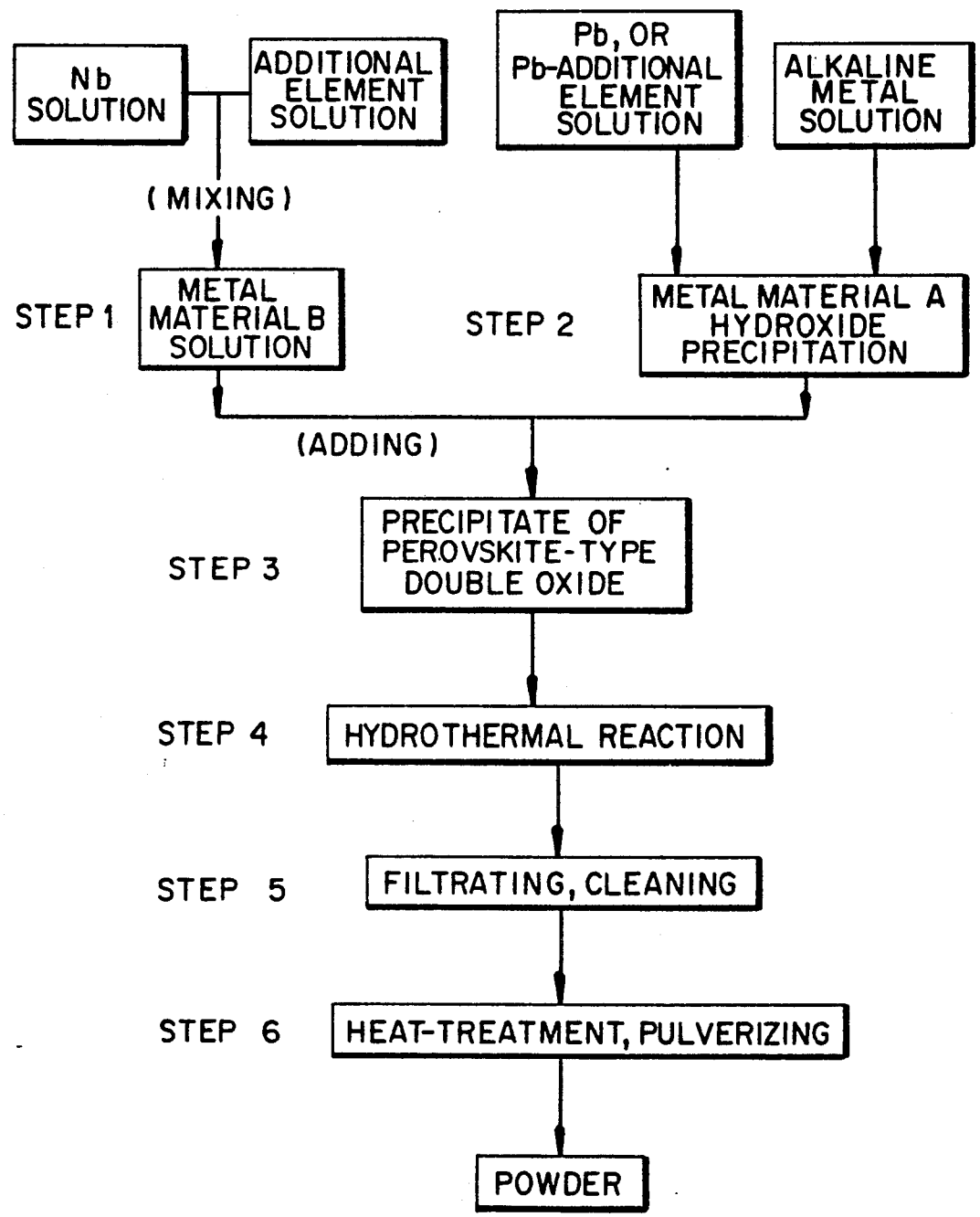
FIG. 1 is a diagram showing the process for producing the powder according to the present invention.

Referring now to FIG. 1;

Step 1

A solution including Nb and a solution including at least one additional element selected from among Zn, Mg, Zr, Ti, Ni, Fe, W, Co, and Mn, are reacted preferable at a temperature.

In the first step, it is one of the features that Nb is allowed to react with at least one additional element selected form among Zn, Mg, Zr, Ti, Ni, Fe, W, Co, and Mn, represented by the formula $ABO_3$ before, that is, Nb is allowed to react with at least one additional element before the reaction of Nb with Pb, in order to inhibit the reaction of Nb with Pb which produces the pyrochlore phase.

Step 2

In this step, a solution including Pb or a solution including Pb and at least one element selected from among Ba, Sr, La, and Li is allowed to react with an aqueous solution of alkaline metal, for example a solution of KOH, in order to obtain a hydroxide precipitate.

Step 3

In this step, the homogeneous solution of metal material B which is obtained by means of the Step 1 is added to the hydroxide precipitate metal material A and aqueous solution of alkaline metal which are obtained by means of the Step 2, in order to obtain metal material B hydroxide precipitate.

The preferable concentration of aqueous solution of alkaline metal using the Step 2 and the Step 3 is in the range of 1~15 mol/l. High concentration may cause a deficiency in degree of sintering because alkaline metal remains in the final powder.

Step 4

This step is a hydrothermal reaction.

In this reaction, that a preferable temperature is in the range of 100° C.~200° C., and a preferable pressure is in the range of 1 atm~15 atm. This hydrothermal reaction is one of the features in this invention. Without this Step 4, it is difficult to obtain the powder of pure perovskite phase because of leading a heterogeneous composition in a series of process steps.

Step 5

This step is filtrating, cleaning and drying the precipitate under usual conditions.

Step 6

This step is heat treating and pulverizing the powder obtained in the manner of the Step 5. The powder is improved in crystallinity by the heat treatment, that is, the heat treatment leads to an increase of perovskite ratio in the powder, and controls grain size. The heat treatment effect is insufficient when that temperature is too low. When that temperature is too high, the powder doesn't come to fine particle by pulverizing, because the powder becomes too large. That temperature is preferable in the range of 500° C.~1000° C.

The heat treated powder is pulverized, and the average diameter of the powder reaches 0.5 μm.

The process, according to the present invention, is excellent as a process for producing a material of producing functional ceramics; such as, piezoelectrics, dielectrics or the like.

DESCRIPTION OF PREFERRED EMBODIMENTS

EXAMPLE 1

A powder of $Pb(Mg_{\frac{1}{3}}Nb_{\frac{2}{3}})_{0.65}Ti_{0.35}O_3$ is produced by the following steps:

Step 1

Aqueous solution, 18.4 g of magnesium nitrate $(Mg(NO_3)_2 \cdot 6H_2O)$ is dissolved in 100 ml of water, added to 31.0 g of aqueous solution of $TiCl_4$ (Ti: 16.7 wt %). The mixture is stirred for 20 minutes at room temperature to obtain a homogeneous solution with Mg and Ti. 60 ml alcohol solution, which includes 36.9 g of niobium chloride ($NbCl_5$), is added to said homogeneous solution with stirring. The mixture is allowed to react for 30 minutes at 60° C. in order to obtain a homogeneous solution of Mg-Ti-Nb.

Step 2

Aqueous solution, 140 g of potassium hydroxide(-KOH) dissolved in 300 ml of water, is added to another aqueous solution, 133.0 g of lead (II) nitrate ($Pb(NO_3)_2$) dissolved in 250 ml of water. The mixture is allowed to react for 30 minutes at room temperature in order to obtain lead group hydroxide precipitate.

Step 3

Said homogeneous solution of Mg-Ti-Nb is added to the suspension, which includes said lead group hydroxide precipitate with stirring. The mixture is allowed to react for 30 minutes at room temperature in order to obtain hydroxide precipitate of Mg-Ti-Nb.

Step 4

Then, the suspension with all its precipitate is moved to the autoclave, and is allowed to react for 5 hours at 180° C. in the autoclave under 8 atm. And the desired oxide precipitate is obtained.

Figure 2:
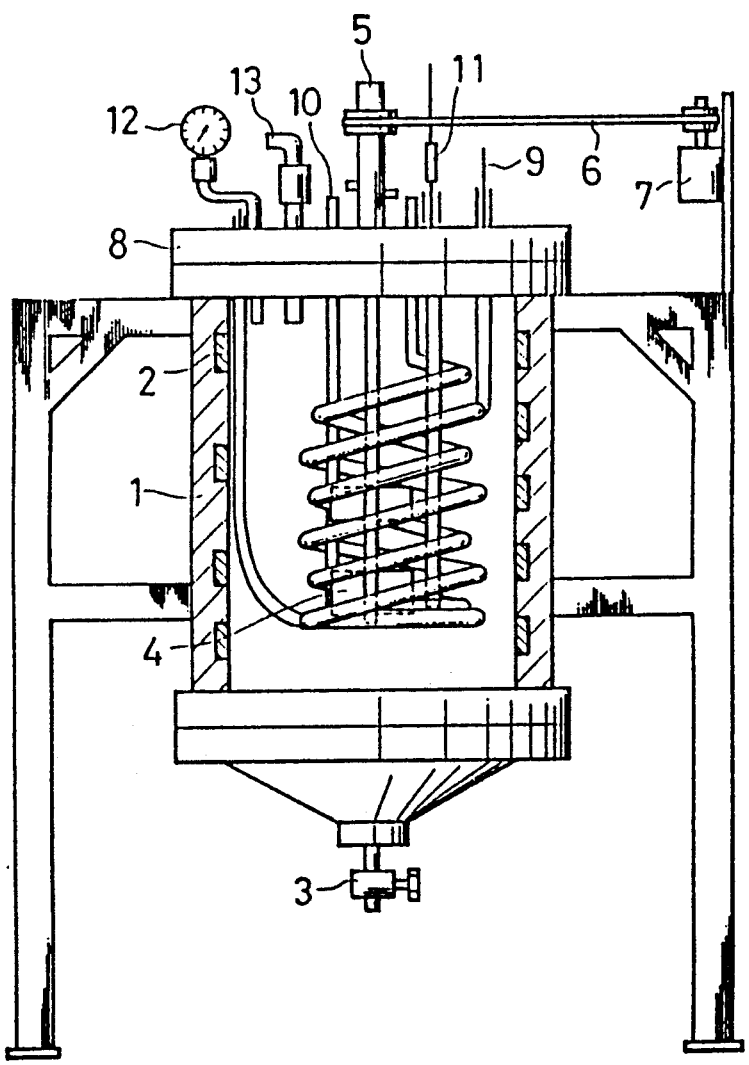
FIG. 2 is a diagrammatic sectional view of an autoclave.

The autoclave, as illustrated in FIG. 2, is housed within a cylindrical container 1 that is molded with heat insulating material to a flexible heater 2 for keeping the heat, and is connected below the container 1 to a ball valve 3. A stirrer 5 having stirring wings 4 is provided at the center of the cylindrical container 1. The stirrer 5 is connected with a stirring motor 7 through V-belt 6. A heater 9, a condenser tube 10, a thermocouple for measuring temperature 11, a pressure gauge 12 and a safety valve 13 are fixed to a flange 8 above the cylindrical container.

In the above-described autoclave, the reaction is subjected to constant temperature and pressure.

Step 5

The produced precipitate is filtered, and washed with room temperature water, and then, dried for 15 hours at 120° C.

Step 6

The powder obtained in the manner described above is heated for 2 hours at 800° C. under atmospheric pressure, and is pulverized by ball mill.

The powder obtained in the manner described above, $Pb(Mg_{\frac{1}{3}}Nb_{\frac{2}{3}})_{0.65}Ti_{0.35}O_3$, is almost pure perovskite phase whereby, in the present example, particle diameter is 0.5 $\mu$m, and total weight is about 95 g.

Figure 3:
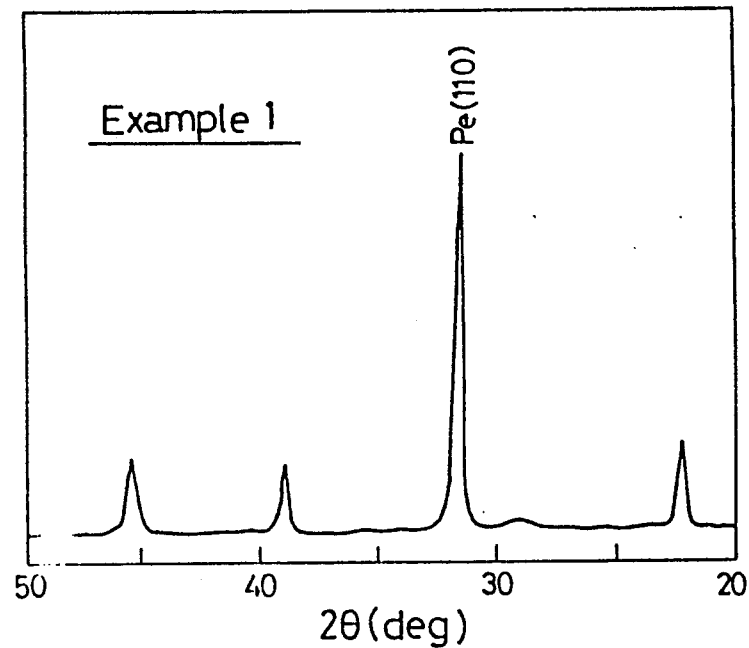
FIGS. 3~6 are diagrams indicating the pattern of X-ray diffraction regarding the powder which is prepared in the manner as in Examples 1~4.

FIG. 3 shows the pattern of X-ray diffraction regarding the powder which is prepared in the manner as in Example 1.

EXAMPLE 2

A powder of $Pb(Mg_{\frac{1}{3}}Nb_{\frac{2}{3}})O_3$ is produced by the following steps:

Step 1

Aqueous solution, 26.3 g of magnesium nitrate $(Mg(NO_3)_2 \cdot 6H_2O)$ dissolved in 100 ml of water, is added to 90 ml of alcohol solution, which includes 55.4 g of niobium chloride $(NbCl_5)$, with stirring. The mixture is allowed to react for 30 minutes at 60° C. in order to obtain a homogeneous solution of Mg-Nb.

Step 2

Aqueous solution, 140 g of potassium hydroxide(-KOH) dissolved in 300 ml of water, is added to another aqueous solution, 101.8 g of lead (II) nitrate $(Pb(NO_3)_2)$ dissolved in 250 ml of water. The mixture is allowed to react for 30 minutes at room temperature in order to obtain lead group hydroxide precipitate.

Step 3

Said homogeneous solution of Mg-Nb is added to the suspension, which includes said lead group hydroxide precipitate, with stirring. The mixture is allowed to react for 30 minutes at room temperature in order to obtain hydroxide precipitate of Mg-Nb.

Step 4

Then, the suspension with all its precipitate is moved to the autoclave, and is allowed to react for 5 hours at 180° C. in the autoclave under 8 atm. And the desired oxide precipitate is obtained.

Step 5

The produced precipitate is filtered, and washed with room temperature water, and then, dried for 15 hours at 120° C.

Step 6

The powder obtained in the manner described above is heated for 2 hours at 800° C. under atmospheric pressure, and is pulverized by ball mill.

The powder obtained in the manner described above, $Pb(Mg_{\frac{1}{3}}Nb_{\frac{2}{3}})O_3$, is almost pure perovskite phase whereby, in the present example, the particle diameter is 0.4 $\mu$m, and the total weight is about 96 g.

Figure 4:
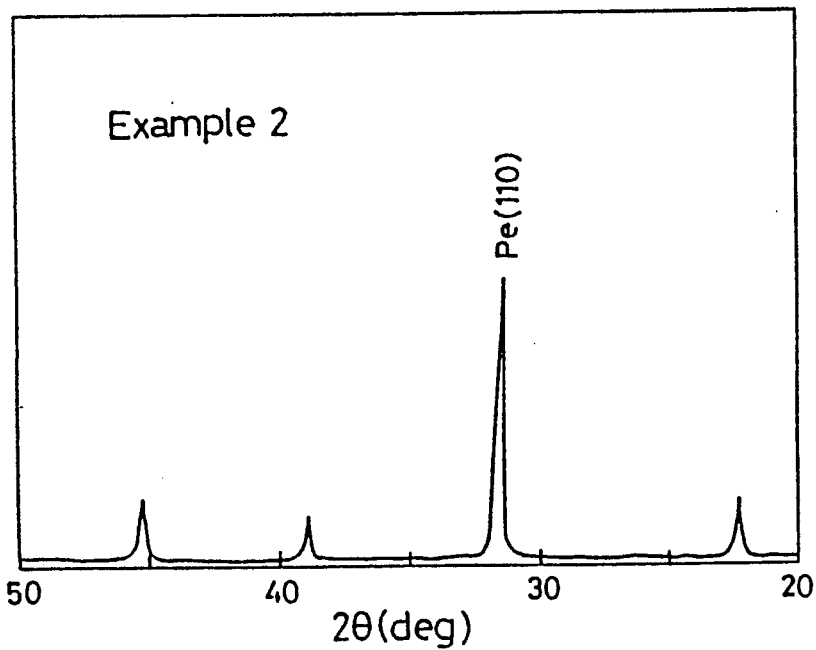

FIG. 4 shows the pattern of X-ray diffraction regarding the powder which is prepared in the manner as in Example 2.

EXAMPLE 3

A powder of $Pb(Ni_{\frac{1}{3}}Nb_{\frac{2}{3}})O_3$ is produced by the following steps.

Step 1

Aqueous solution, 23.5 g nickel chloride $(NiCl_2 \cdot 6H_2O)$ dissolved in 100 ml of water, is added to 90 ml alcohol solution, which includes 53.5 g of niobium chloride $(NbCl_5)$ with stirring. The mixture is allowed to react for 30 minutes at 60° C. in order to obtain a homogeneous solution of Ni-Nb.

Step 2

Aqueous solution of, 140 g of potassium hydroxide(-KOH) dissolved in 300 ml of water, is added to aqueous solution, 103.3 g of lead (II) nitrate $(Pb(NO_3)_2)$ dissolved in 250 ml of water. The mixture is allowed to react for 30 minutes at room temperature in order to obtain lead group hydroxide precipitate.

Step 3

Said homogeneous solution of Ni-Nb is added to the suspension, which includes said lead group hydroxide precipitate, with stirring. The mixture is allowed to react for 30 minutes at room temperature in order to obtain hydroxide precipitate of Ni-Nb.

Step 4

Then, the suspension with all its precipitate is moved to the autoclave, and is allowed to react for 5 hours at 180° C. in the autoclave under 8 atm. And the desired oxide precipitate is obtained.

Step 5

The produced precipitate is filtered, and washed with room temperature water, and then, dried for 15 hours at 120° C.

Step 6

The powder obtained in the manner described above is heated for 2 hours at 800° C. under atmospheric pressure, and is pulverized by ball mill.

The powder obtained in the manner described above, $Pb(Ni_{\frac{1}{3}}Nb_{\frac{2}{3}})O_3$, is almost pure perovskite phase whereby, in the present example, the particle diameter is 0.5 $\mu$m, and total weight is about 94 g.

Figure 5:
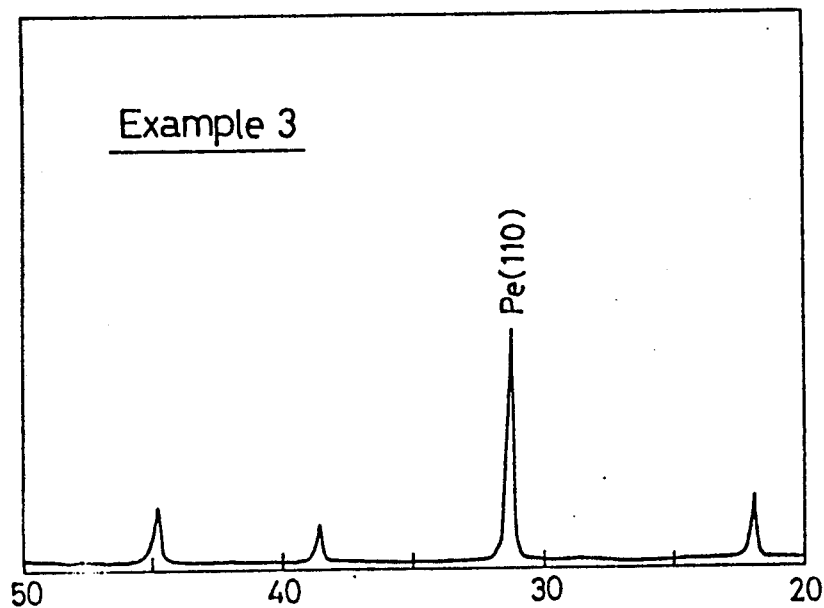

FIG. 5 shows the pattern of X-ray diffraction regarding the powder which is prepared in the manner as in Example 3.

EXAMPLE 4

A powder of $Pb(Fe_{\frac{1}{2}}Nb_{\frac{1}{2}})O_3$ is produced by the following steps:

Step 1

Aqueous solution, 61.3 g iron (II) nitrate (Fe(NO$_3$)$_3$·9H$_2$O) dissolved in 200 ml of water, is added 80 ml of alcohol solution, which includes 41.0 g of niobium chloride (NbCl$_5$) with stirring. The mixture is allowed to react for 30 minutes at 60° C. in order to obtain a homogeneous solution of Fe-Nb.

Step 2

Aqueous solution, 140 g of potassium hydroxide(KOH) dissolved in 300 ml of water, is added to another aqueous solution, 105.5 g of lead (II) nitrate (Pb(NO$_3$)$_2$) dissolved in 250 ml of water. The mixture is allowed to react for 30 minutes at room temperature in order to obtain lead group hydroxide precipitate.

Step 3

Said homogeneous solution of Fe-Nb is added to the suspension, which includes said lead group hydroxide precipitate, with stirring. The mixture is allowed to react for 30 minutes at room temperature in order to obtain hydroxide precipitate of Fe-Nb.

Step 4

Then, the suspension with all its precipitate is moved to the autoclave, and is allowed to react for 5 hours at 180° C. in the autoclave under 8 atm. And the desired oxide precipitate is obtained.

Step 5

The produced precipitate is filtered, and washed with room temperature water, and then, dried for 15 hours at 120° C.

Step 6

The powder obtained in the manner described above is heated for 2 hours at 800° C. under atmospheric pressure, and is pulverized by ball mill.

The powder obtained in the manner described above, $Pb(Fe_{\frac{1}{2}}Nb_{\frac{1}{2}})O_3$, is almost pure perovskite phase whereby, in the present example, the particle diameter is 0.5 μm, and the total weight is about 94 g.

Figure 6:
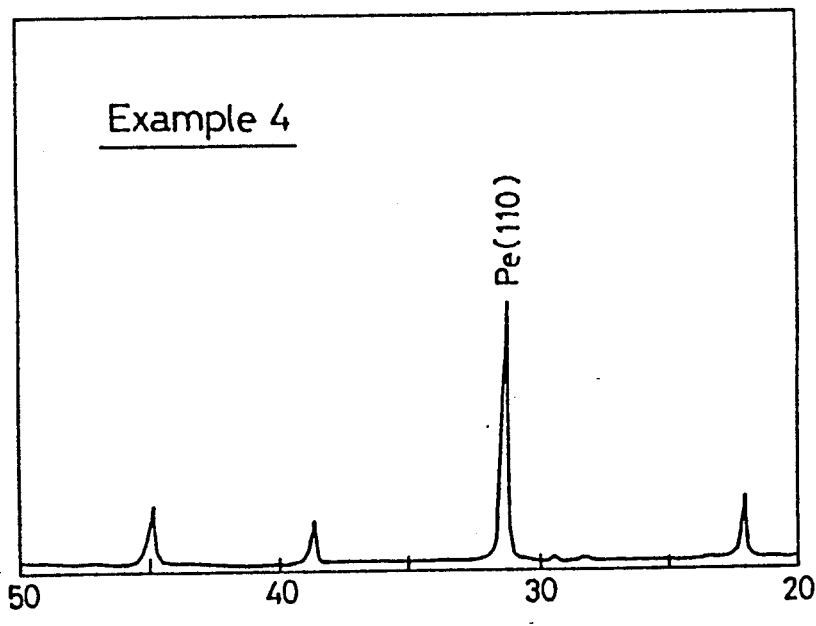

FIG. 6 shows the pattern of X-ray diffraction regarding the powder which is prepared in the manner as in Example 4.

COMPARATIVE EXAMPLE 1

The powder, which is similar to Example 1 in composition, $Pb(Mg_{\frac{1}{3}}Nb_{\frac{2}{3}})_{0.65}Ti_{0.35}O_3$, is synthesized with PbO, MgO, TiO$_2$ and Nb$_2$O$_5$, by means of general solid phase synthesis which includes the step of calcining for 1 hour at 1000° C.

Figure 7:
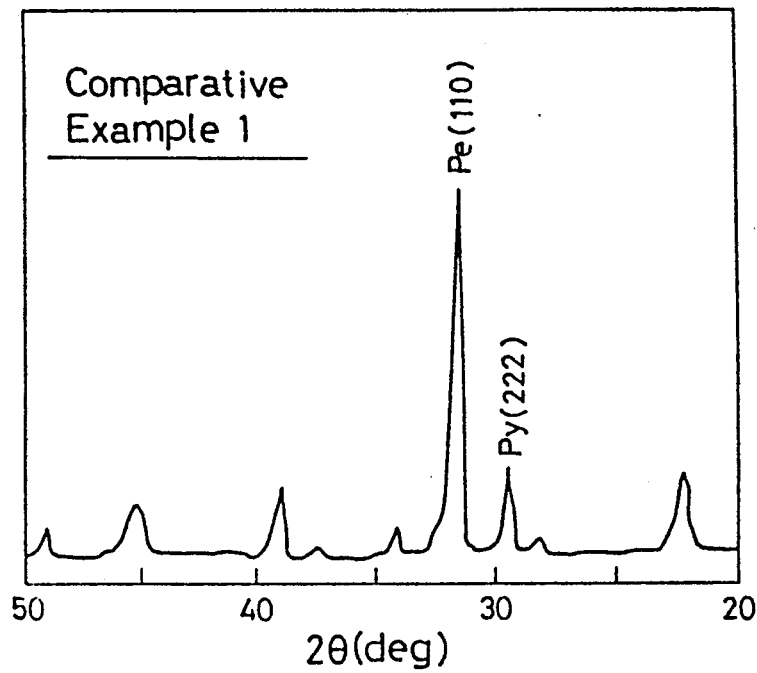
FIGS. 7~10 are diagrams indicating the pattern of X-ray diffraction regarding the powder which is prepared in the manner as in Comparative Examples 1~4.

FIG. 7 shows the pattern of X-ray diffraction regarding the powder which is prepared in the manner as in Comparative Example 1.

COMPARATIVE EXAMPLE 2

The powder in which the composition is $Pb(Mg_{\frac{1}{3}}Nb_{\frac{2}{3}})_{0.65}Ti_{0.35}O_3$, is synthesized with similar material and process steps as an to Example 1, except for the Steps 1 and 3. Step 1 is omitted, and each solution of Mg, Nb, Ti is separately added to the suspension which includes lead group hydroxide precipitate in Step 3.

Figure 8:
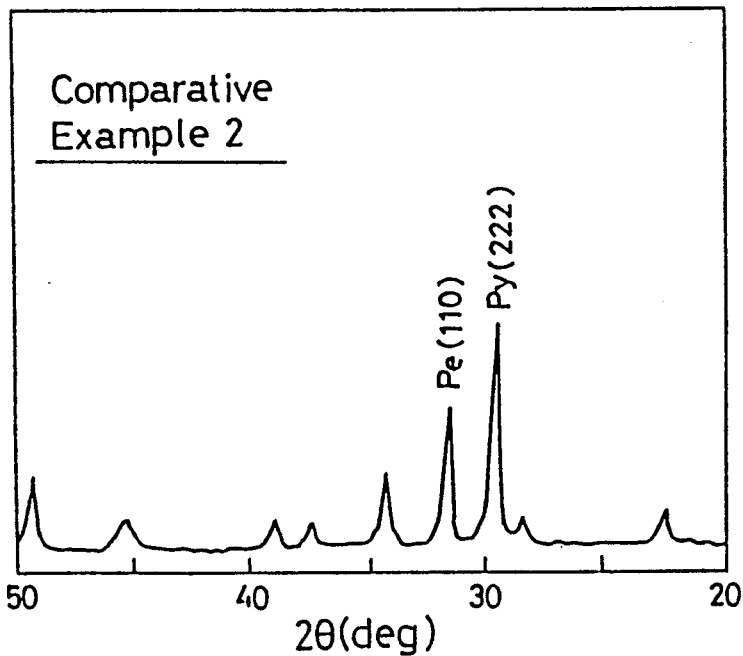

FIG. 8 shows the pattern of X-ray diffraction regarding the powder which is prepared in the manner as in Comparative Example 2.

COMPARATIVE EXAMPLE 3

The powder, which is similar to Example 1 in composition, $Pb(Mg_{\frac{1}{3}}Nb_{\frac{2}{3}})_{0.65}Ti_{0.35}O_3$, is synthesized with similar material and process steps as in Example 1, except for Step 4. Step Y is omitted.

Figure 9:
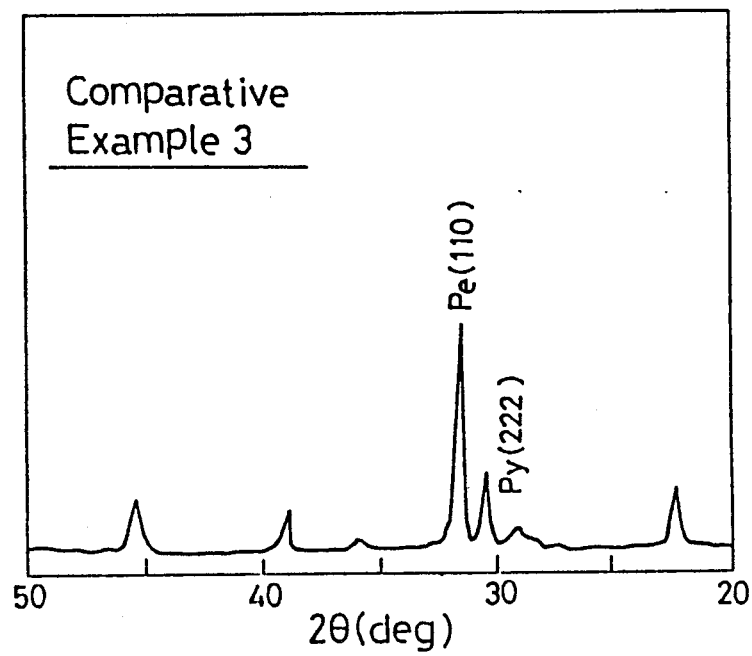

FIG. 9 shows the pattern of X-ray diffraction regarding the powder which is prepared in the manner as in Comparative Example 3.

COMPARATIVE EXAMPLE 4

The powder in which the composition is $Pb(Mg_{\frac{1}{3}}Nb_{\frac{2}{3}})O_3$, is synthesized with similar material and process steps as in Example 2, except for the Steps 1 and 3. Step 1 is omitted, and each solution of Mg, Nb is separately added to the suspension which includes lead group hydroxide precipitate in Step 3.

Figure 10:
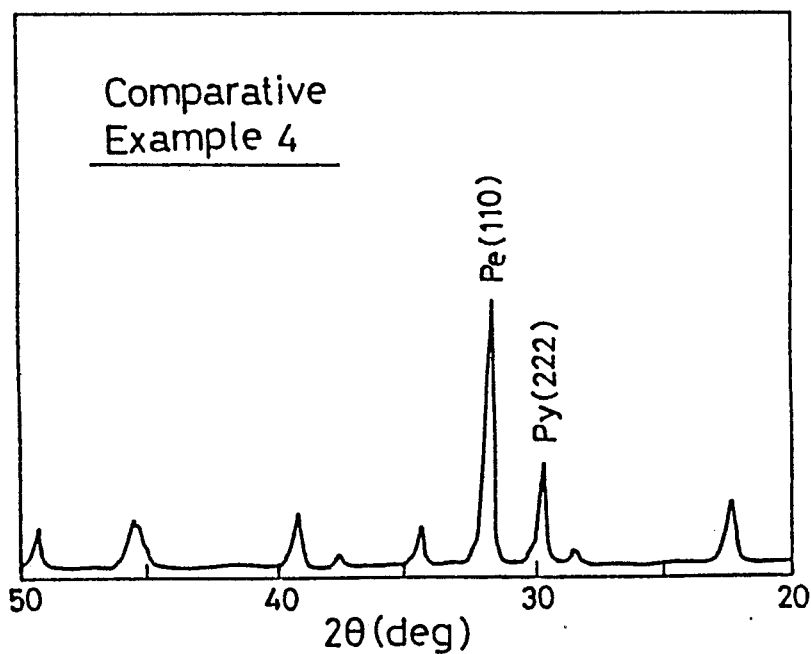

FIG. 10 shows the pattern of X-ray diffraction regarding the powder which is prepared in the manner as in Comparative Example 4.

Table 1 shows particle diameter and perovskite ratio of the powder which is produced with Examples 1, 2, 3, 4 and Comparative Examples 1, 2, 3, 4 respectively.

TABLE 1

| | composition | perovskite ratio (%) | particle diameter (μm) |
|---|---|---|---|
| EXAMPLE | | | |
| No. 1 | $Pb(Mg_{\frac{1}{3}}Nb_{\frac{2}{3}})_{0.65}Ti_{0.35}O_3$ | 100 | 0.5 |
| No. 2 | $Pb(Mg_{\frac{1}{3}}Nb_{\frac{2}{3}})O_3$ | 99 | 0.4 |
| No. 3 | $Pb(Ni_{\frac{1}{3}}Nb_{\frac{2}{3}})O_3$ | 100 | 0.5 |
| No. 4 | $Pb(Fe_{\frac{1}{2}}Nb_{\frac{1}{2}})O_3$ | 99 | 0.5 |
| COMPARATIVE EXAMPLE | | | |
| No. 1 | $Pb(Mg_{\frac{1}{3}}Nb_{\frac{2}{3}})_{0.65}Ti_{0.35}O_3$ | 81 | 1.6 |
| No. 2 | $Pb(Mg_{\frac{1}{3}}Nb_{\frac{2}{3}})_{0.65}Ti_{0.35}O_3$ | 39 | 0.5 |
| No. 3 | $Pb(Mg_{\frac{1}{3}}Nb_{\frac{2}{3}})_{0.65}Ti_{0.35}O_3$ | 92 | 0.8 |
| No. 4 | $Pb(Mg_{\frac{1}{3}}Nb_{\frac{2}{3}})O_3$ | 72 | 0.6 |

Perovskite ratio is estimated on the basis of pattern of X ray diffraction with follows;

$$\text{Perovskite ratio} = \frac{I_{Pe}}{I_{Pe} + I_{Py}} \times 100(\%)$$

$I_{pe}$ means peak intensity of face (110) of perovskite phase, and $I_{py}$ means peak intensity of face(222) of pyrochlore.

Table 1 shows that the powder obtained by examples according to this invention is almost pure perovskite phase, and that particle diameter of the powder is fine, such as 0.5 μm or less.

The powder obtained by comparative examples is not pure perovskite phase. The powder of Comparative Example 2 in which the particle diameter is relatively fine, is remarkably inferior in perovskite ratio.

The relationship between temperature and relative permittivity and dissipation factor is determined on the powder obtained in Example 2 and Comparative Example 4 (frequency: 1 KH$_Z$, voltage: 1 V). The powder is sintered at 1000° C. for 2 hours, consequently, sintered compact which size is 12φ×1 mm, is obtained.

Figure 11:
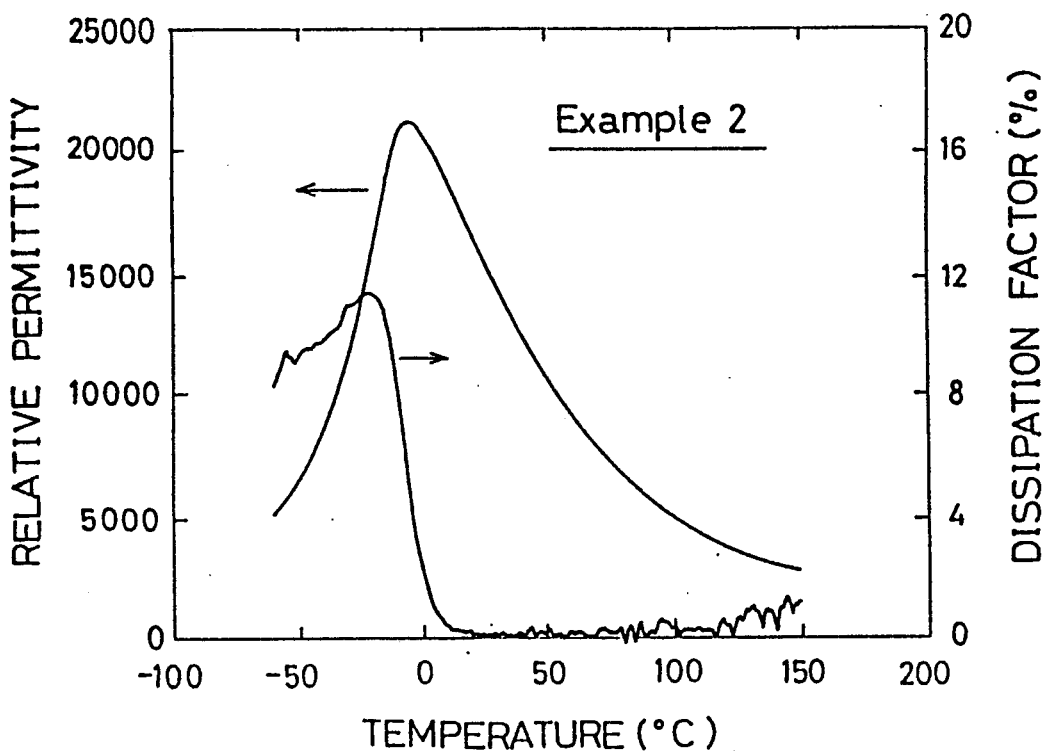
FIG. 11 is a diagram indicating the relationship between temperature and relative permittivity and dissipation factor of the powder obtained in Example 2.
Figure 12:
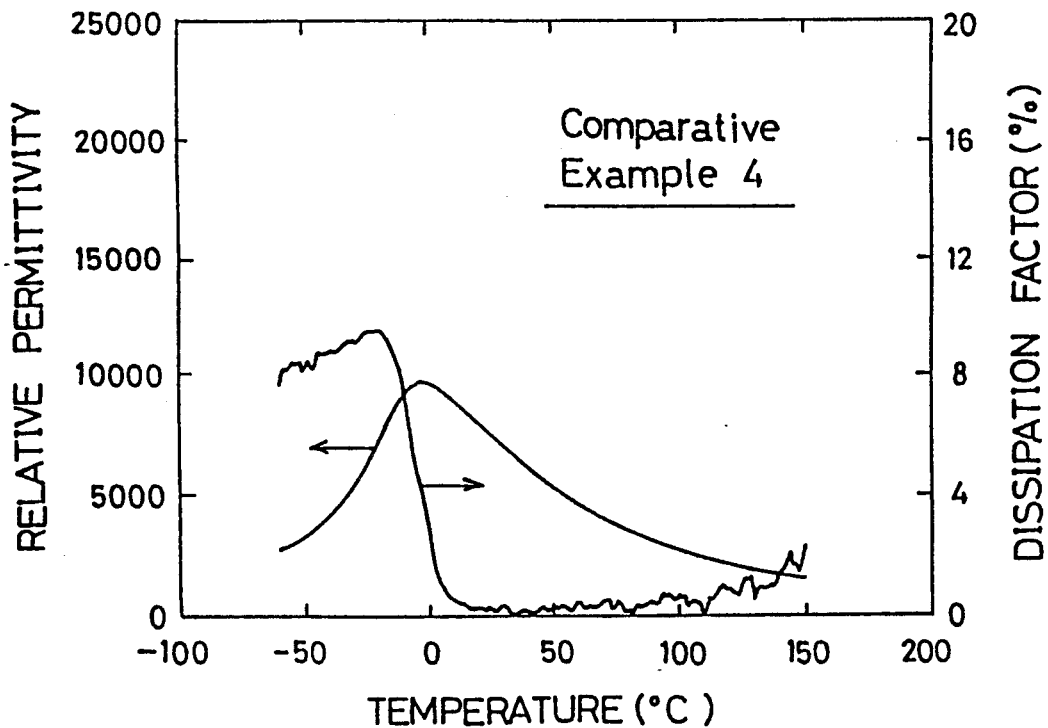
FIG. 12 is a diagram indicating the relationship between temperature and relative permittivity and dissipation factor of the powder obtained in Comparative Example 4.

The results are shown in FIG. 11 and FIG. 12.

A maximum relative permittivity is as large as about 21000 in the sintered compact made from the powder in Example 2. In contrast, a maximum relative permittivity is as large as about 10000 in the sintered product made from the powder in Comparative Example 4.

Dissipation factor is stably about 0 in the vicinity of room temperature in the sintered product made from the powder in Example 2. In contrast, dissipation factor is relatively unstable in the sintered product made from the powder in Comparative Example 4.

Considering that the sintering temperature is relatively as low as 1000° C. in this present invention compared with 1200° C. in said solid phase synthesis, relative permittivity and dissipation factor is excellent.

What is claimed is:

1. A process for producing a powder of perovskite-type double oxide represented by the formula $ABO_3$, wherein A represents a metal material which is at least one member selected from the group consisting of Pb and a combination of Pb and at least one element selected form among Ba, Sr, Ca, La, and Li, B represents a metal material selected from the group consisting of a combination of Nb and at least one additional element selected from among Zn, Mg, Zr, Ti, Ni, Fe, W, Co, and Mn, and O represents oxygen, comprising the steps of:

forming a homogeneous solution containing metal material B, by adding a solution containing a metal ion of Nb to a solution containing a metal ion of at least on of said additional element thereby preparing a homogeneous containing metal material B;

reacting a solution containing a metal material A, and an aqueous solution of alkaline metal in a reaction vessel, thereby precipitating the hydroxide of metal material A;

adding said homogeneous solution containing metal material B to said hydroxide precipitate of metal material A in a reaction vessel, thereby precipitating the hydroxide of metal material B in the obtained mixture;

reacting hydrothermally the obtained mixture in the reaction vessel;

filtering the reacted mixture; cleaning and drying the filtered precipitate; and heat-treating and pulverizing the dried precipitate.

2. A process according to claim 1, wherein temperature of the hydrothermal reaction is between 100° C. and 200° C., and pressure of the hydrothermal reaction is between 1 atm and 15 atm.

* * * * *